(12) United States Patent
Cromer et al.

(10) Patent No.: US 7,003,331 B2
(45) Date of Patent: Feb. 21, 2006

(54) APPARATUS, METHOD AND PROGRAM TO OPTIMIZE BATTERY LIFE IN A WIRELESS DEVICE

(75) Inventors: Daryl Carvis Cromer, Apex, NC (US); Philip John Jakes, Durham, NC (US); Howard Jeffrey Locker, Cary, NC (US); James Peter Ward, Raleigh, NC (US)

(73) Assignee: Lenovo (Singapore) Pte. Ltd., (SG)

( * ) Notice: Subject to any disclaimer, the term of this patent is extended or adjusted under 35 U.S.C. 154(b) by 547 days.

(21) Appl. No.: 10/180,048

(22) Filed: Jun. 26, 2002

(65) Prior Publication Data

US 2004/0002366 A1 Jan. 1, 2004

(51) Int. Cl.
*H04M 1/00* (2006.01)
(52) U.S. Cl. ............ 455/574; 455/572; 455/448; 370/338; 370/208; 375/346
(58) Field of Classification Search ............. 455/448, 455/574, 572; 370/338, 208; 375/346; 349/143
See application file for complete search history.

(56) References Cited

U.S. PATENT DOCUMENTS

| | | | |
|---|---|---|---|
| 5,566,366 A | 10/1996 | Russo et al. | 455/343 |
| 5,657,317 A | 8/1997 | Mahany et al. | 370/338 |
| 5,696,903 A | 12/1997 | Mahany | 395/220.58 |
| 5,949,776 A | 9/1999 | Mahany et al. | 370/338 |
| 6,047,200 A | 4/2000 | Gibbons et al. | 455/574 |
| 6,067,291 A | 5/2000 | Kamerman et al. | 370/338 |
| 6,085,114 A | 7/2000 | Gibbons et al. | 455/574 |
| 6,216,019 B1 | 4/2001 | Gibbons et al. | 455/574 |
| 6,243,597 B1 | 6/2001 | Daanen | 455/574 |
| 2002/0101557 A1 * | 8/2002 | Ono et al. | 349/143 |
| 2003/0086515 A1 * | 5/2003 | Trans et al. | 375/346 |
| 2004/0077353 A1 * | 4/2004 | Mahany | 455/448 |
| 2004/0081076 A1 * | 4/2004 | Goldstein et al. | 370/208 |
| 2005/0036467 A1 * | 2/2005 | Kubler et al. | 370/338 |

FOREIGN PATENT DOCUMENTS

JP          8228173 A          3/1996

* cited by examiner

*Primary Examiner*—Lester G. Kincaid
*Assistant Examiner*—Phuoc Doan
(74) *Attorney, Agent, or Firm*—VanLeeuwen & VanLeeuwen; Carlos Munez-Bustamante (57) ABSTRACT

The battery life of batteries of a mobile device operating in a wireless network is optimized by dynamically changing symbol rates and bits per symbol and selecting one for communicating based upon the source providing power to the mobile device.

30 Claims, 9 Drawing Sheets

APPARATUS, METHOD AND PROGRAM TO OPTIMIZE BATTERY LIFE IN A WIRELESS DEVICE

BACKGROUND OF THE INVENTION

1. Field of the Invention

The present invention relates to wireless networks in general and in particular to power management in devices operating in said wireless networks.

2. Prior Art

The use of wireless devices and wireless networks as a means for accessing remote office computers, the Internet or communicating with other wireless devices is well known in the prior art. The popularity of wireless devices has increased significantly due in part to the fact that they can be used wherever one chooses to use them and there is a wireless network to make the interconnection.

Because of this synergism it is almost impossible to separate wireless devices from wireless networks. Stated another way, when one uses wireless devices a wireless network is also used whether the user is aware or not aware of the wireless network. In this regard the wireless network, if not already, is becoming a standard part of mobile technology. When compared with wired networks wireless networks may have functional advantages. For example, their availability for use anywhere; without the need for cables to be attached.

In spite of these advantages, there are also disadvantages. Probably the most striking disadvantage is that a wireless network imposes significant energy drain on the mobile device battery. The battery drain phenomenon occurs because when the mobile device is wirelessly connected to the wireless network it must continuously receive and transmit high power radio signals. As a consequence it is believed that wireless network may reduce battery life>(greater than) 50%.

Most prior art attempts to solve this problem either adjust radio power or place mobile units in low power, also called sleep, mode. It seems as if the prior art solution could adversely affect the throughput of the mobile device.

In view of the above there is a need to provide a more effective and efficient method and apparatus that address the battery drain phenomenon and at the same time does not adversely affect throughput of the mobile device.

SUMMARY OF THE INVENTION

The present invention provides apparatus and method that extend battery life by dynamically changing symbol rate and bits per symbol. As a consequence power consumption is reduced without reducing throughput.

In particular the mobile unit is provided with three power rails, namely: battery, DC and Auxiliary (Aux). A power type detector monitors the power rails to determine which one is supplying power to the mobile unit. If power is provided by DC or Aux maximum symbol rate with low number of bits per symbol is requested of the Access Point. The Access Point which is capable of operating at different symbol rates will grant the request if it is capable of operating at the requested symbol rate. If the request is granted both Access Point and mobile device switch to the agreed to symbol rate to communicate.

If power is provided by battery, the battery power is tested; if greater than 50% a lower symbol rate with higher number of bits per symbol is requested of the Access Point by the mobile unit. If the Access Point supports the requested symbol rate and number of bits per symbol and if granted both Access Point and mobile unit switch to communicate at the agreed symbol rate.

If the battery power is less than 50% the minimum symbol rate and max number of bits per symbol is requested and if granted by the Access Point both Access Point and mobile unit switch and communicate at the agreed symbol rate.

One of the interesting observations is that by transmitting at lower symbol rates battery life increases. The increase in battery life occurs because the transmitter chip set requires less current when running at a slower symbol rate. The throughput is maintained at the slower symbol rate by increasing the number of bits per symbol.

BRIEF DESCRIPTION OF THE DRAWINGS

The invention as well as a preferred mode of use, further objects and advantages thereof will best be understood by reference to the following detailed description of an illustrative embodiment when read in conjunction with the accompanying drawings, wherein.

DETAILED DESCRIPTION OF THE INVENTION

Figure 1:
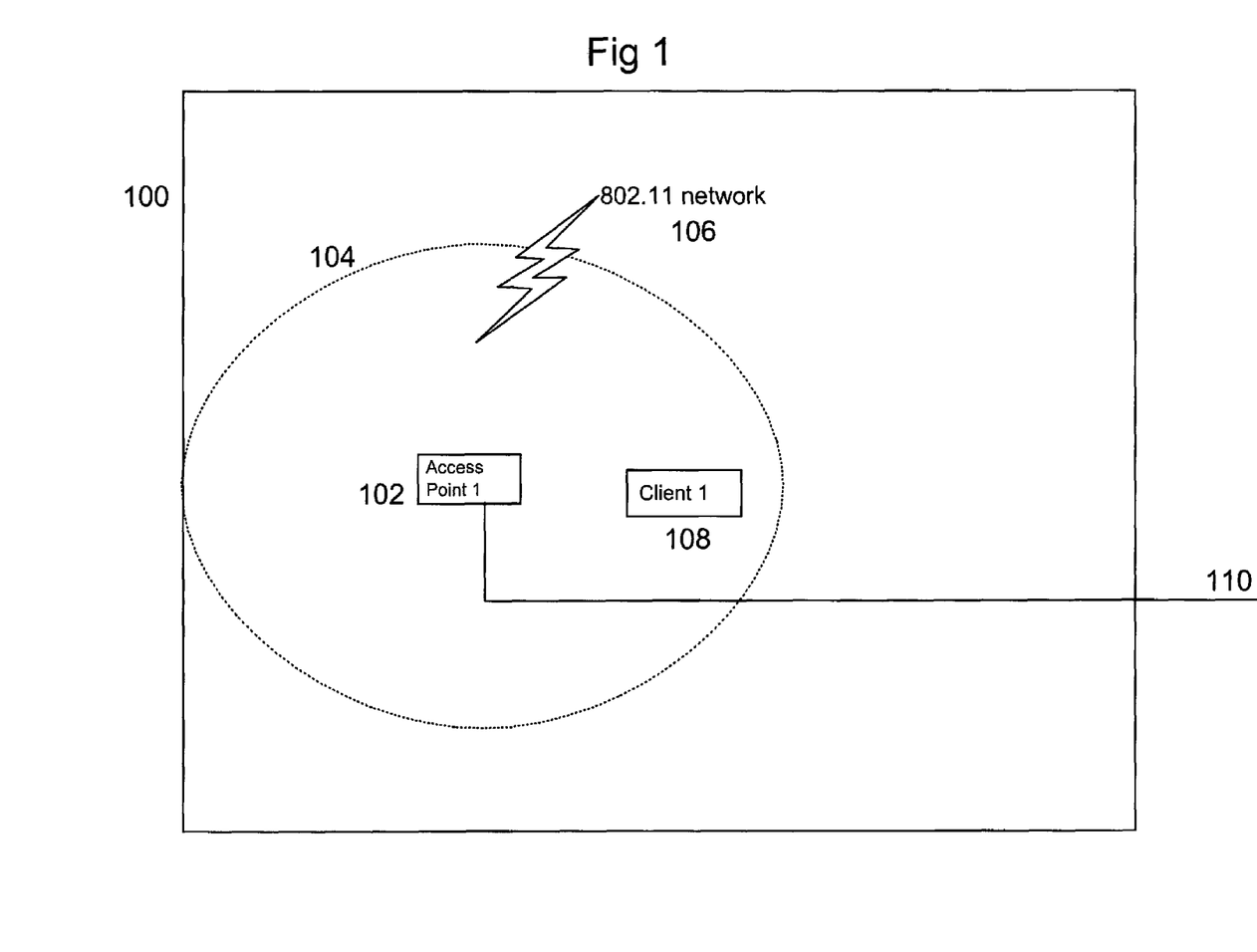
FIG. 1 shows a schematic of a wired and wireless network in which the present invention is implemented.

FIG. 1 shows a schematic for a network in which the present invention is implemented. The network 100 includes wireless LAN 106 and wired LAN 110. The wireless LAN 106 operates in accordance with IEEE 802.11 specification for wireless networks. The wires LAN 110 is preferably an ethernet LAN running at 100 Mbps. Access Point 102 is shown connected to ethernet LAN 110 while a wireless node or device 108 is shown positioned within signal range, delineated by dash lines 104, of Access Point 102. With client device 108 being in the operating range of Access Point 102, the client device 108 is able to transmit and receive information to and from Access Point 102.

Figure 2:
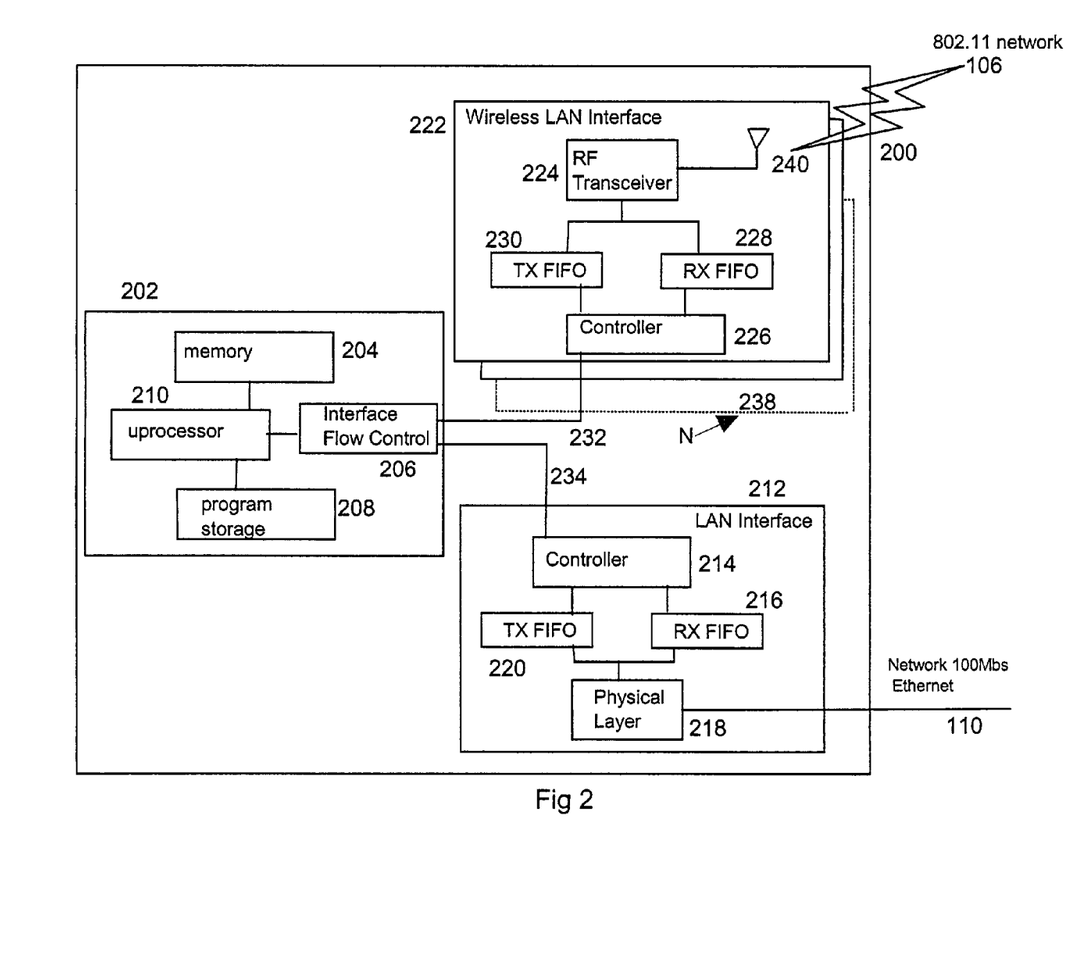
FIG. 2 shows a block diagram of an Access Point (AP) according to the teachings of the present invention.

FIG. 2 shows a block diagram of the Access Point (AP) according to the teachings of the present invention. Elements in FIG. 2 that are similar to elements in FIG. 1 are identified with like numerals and will not be discussed further. The Access Point 200 includes controller 202, wireless LAN adapters 222, 238 . . . N and wired LAN adapter 212. The wireless LAN adapters 222, 238 . . . N provides a wireless LAN interface to controller 202 whereas wired LAN adapter 212 provides a wired LAN interface to the ethernet LAN 110. As will be discussed in greater detail hereinafter each of the adapters 222, 238 . . . N (N being total number of wireless adapters) operates (transmit/receive) at different symbol rate and different bit rate. As a consequence the Access Point can communicate with mobile devices running at adjustable symbol rate and adjustable bit rate. The controller 202 is coupled by bus 232 to wireless LAN adapters 222, 238 . . . N and by bus 234 to wired LAN adapter 212. The controller 202 includes memory 204, interface flow control logic 206, program storage 208, and microprocessor 210. The named components 204, 206, 208 and 210 are interconnected as shown in FIG. 2. The program storage 208 stores control program (firmware) that microprocessor 210 runs or executes to support the wired and wireless networks. The data store 204 is used to temporarily hold data that is being transferred between wireless network and the wired network 110. The interface flow control logic 206 controls the movement of data from controller 202 to the wireless adapters 222, 238 . . . N and to wired adapter 212.

In an alternate embodiment a single wireless adapter that supports multiple concurrent channels which can change symbol rate and bit rate dynamically could be used in the Access Point.

The LAN adapter 212 provides the LAN interface to ethernet LAN 110. Wired LAN adapter 212 includes Controller 214, TX FIFO 220, RX FIFO 216 and Physical Layer 218. Controller 214 provides MAC (medium access control) functions for the LAN adapter 212. Controller 214 is connected to TX FIFO 220 and RX FIFO 216. The TX FIFO 220 holds data to be transmitted onto the ethernet LAN whereas the RX FIFO 216 receives data from ethernet LAN 110. TX FIFO 220 and RX FIFO 216 are connected to Physical Layer 218. The Physical Layer 218 provides physical function to the adapter which includes conversion of digital to analog signals compliant with ethernet specification, provides physical connection to network 110, etc.

Still referring to FIG. 2, each of the wireless LAN adapters, such as wireless LAN adapter 222 is designed to run protocols specified by IEEE 802.11b wireless LAN specification. In addition, each of the wireless adapters runs at a different symbol rate and a different bit rate. The wireless LAN adapter 222 or 238 . . . N includes RF Transceiver 224, TX FIFO 230, RX FIFO 228 and Controller 226. The named components are connected as shown in the figure. The Controller 226 provides interface function and is commonly known as medium access control (MAC). The MAC is connected to the TX FIFO 230 which holds data to be subsequently transmitted to the wireless network. Likewise, the RX FIFO 228 holds data that is received from the wireless network. The RF Transceiver 224 and power amplifier antenna 240 converts digital signals to radio frequency energy compliant with 802.11b specification. The RF Transceiver and power amplifier antenna 240 also receives radio frequency signals and converts them to digital signals. As a consequence the RF Transceiver and power amplifier antenna 240 includes both a transmitting subsystem and a receiver subsystem. The transmitting subsystem handles data which is transmitted into the wireless network 106 whereas the receiving subsystem manages data received from the wireless network 106. RF transceivers and power amplifier antenna 240 are well known in the prior art and further discussions are not warranted. It should be noted components on wireless adapters 238 . . . N are not shown but are identical to the components described for wireless adapter 222. The primary difference between the multiple wireless adapters 222, 238 . . . N is that each one operates on a different channel at different symbol rates and different bit rates. It should be noted that 802.11 specification defines 14 channels in the 2.4 Ghz band.

Figure 3:
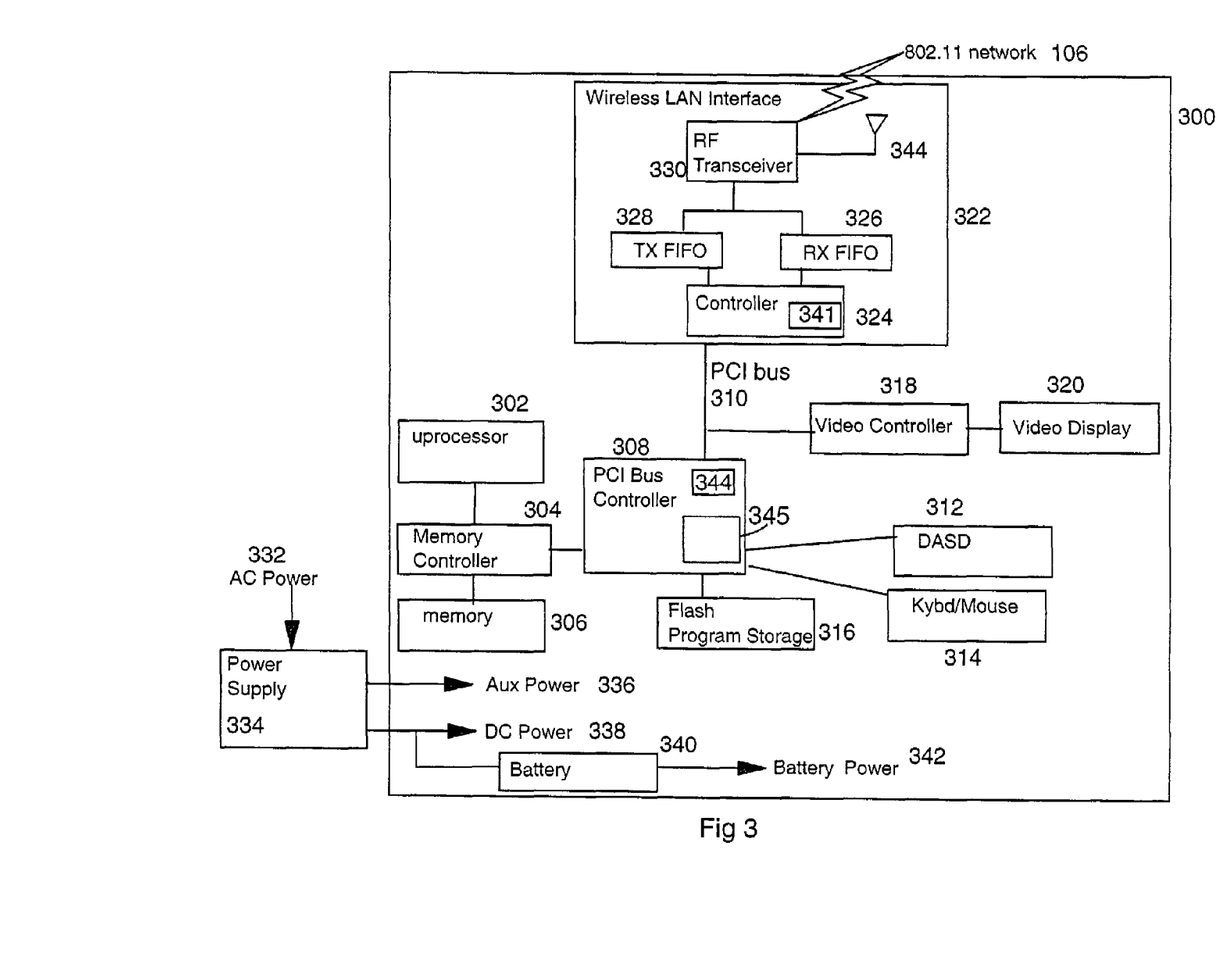
FIG. 3 shows a block diagram of a mobile device according to the teachings of the present invention.

FIG. 3 shows a block diagram of the structure for a client device such as a portable computer or like device. The client 300 includes peripheral component interface (PCI) bus controller 308 to which DASD 312, keyboard/mouse 314, flash program storage 316 and memory controller 304 are connected. The function of PCI bus controller 308 includes arbitrating between the attached devices and enabling those devices to access the memory 306 and DASD 312. The microprocessor 302 is coupled through the memory controller 304 to the memory 306. The memory controller 304 controls the memory 306. The flash program storage 316 contains initialization program or bios that is used to establish the client in an operating state when it is first turned on.

Figure 4:
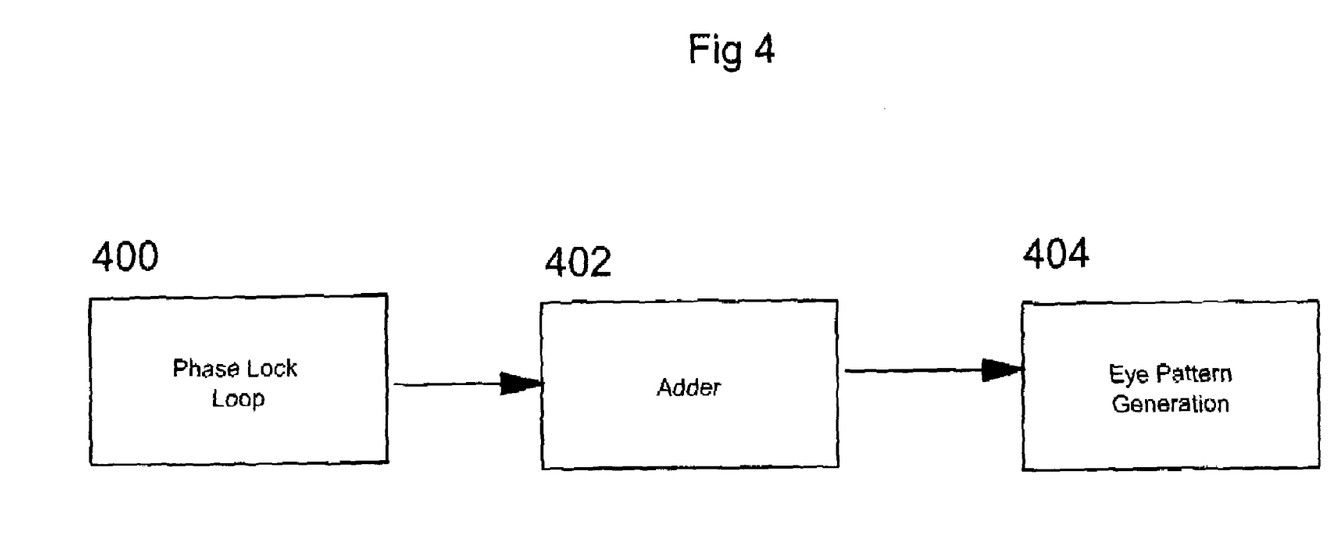
FIG. 4 shows a schematic of the circuit that generates the symbol rate according to the teachings of the present invention.

Still referring to FIG. 3, PCI expansion bus 310 connects video controller 318 and wireless adapter 322 to the PCI bus controller 308. The video controller 318 is connected to a video display 320. The video controller 318 manages the information to be displayed on the video display 320. The wireless adapter 322 provides the wireless LAN interface that allows a client to communicate via radio waves to an Access Point. As a consequence, the wireless adapter 322 includes power amplifier/antenna 344 coupled to RF Transceiver 330 which is connected to TX FIFO 328 and RX FIFO 326. Controller 324 couples TX FIFO 328 and RX FIFO 326 to the PCI bus 310. The Controller 324 performs the MAC functions that allow the wireless adapter 322 to interface with the PCI bus and process data according to the protocols set forth in IEEE 802.11 standard for wireless network. The RF Transceiver 330 includes both the transmitting section and a receiving section that function in a way similar to that of previously described RF Transceiver 224. A symbol and bit rate generator 341 that generates variable symbols based upon the power source on which the mobile device is running is also provided. A circuit diagram for symbol generator 341 is shown in FIG. 4. Even though the symbol generator is shown as part of the controller 324 this should not be construed as a limitation on the invention. In the actual design it can be mounted anywhere the designer chooses within the mobile device.

Still referring to FIG. 3, the present invention allows the client device 300 to maintain a constant data throughput as it changes to lower power modes to control battery life. To this end the client device 300 includes a power subsystem including power supply 334 with an input to be coupled to AC power source 332 and two output power rails labeled Aux Power 336 and DC Power 338. A battery 340 is connected to DC Power 338 and generates an output labeled Battery Power 342. Aux Power 336 is available whenever client device 300 is connected to external power supply 334. DC Power 338 is provided whenever client device 300 is connected to power supply 334 and powered on. DC power is always provided to battery 340. Battery power 342 is available as long as battery 340 has charge. Power Type Detector (PTD) 345 monitors Aux Power 336, DC Power 338 and Battery Power 342 and sets a bit in Power Source Register 344 to indicate the source that is providing power to client device 300. PTD 345 could be a PLA (Program Logic Array) or other combinatorial logic designed in accordance to the flowchart set forth in FIG. 6 and described hereinafter. As will be discussed herein the type of power being used will determine the symbol rate and bit rate selected and used by the client device to transmit data. The symbol rate selected is stored in symbol rate register 344.

Figure 5:
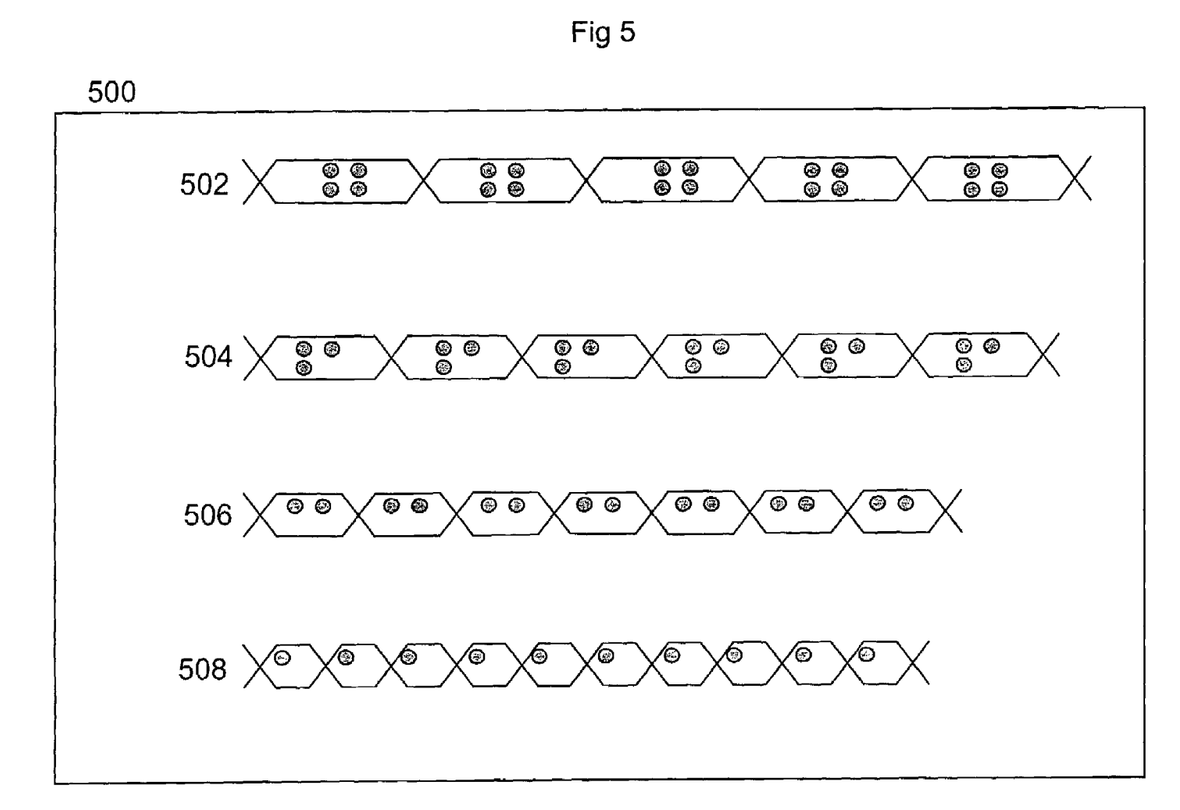
FIG. 5 shows a schematic of the adjustable symbol rate and adjustable bit rate according to the teachings of the present invention.

FIG. 4 shows a block diagram of the circuit that generates the variable symbol rate. Phase lock loop 400 generates the base timing waveform. The output of phase lock loop 400 is provided to adder circuit 402 which adds the fundamental frequency pulse (not shown) to obtain the frequency of the desired symbol rate. The output of adder circuit 402 provides the timing for the Eye Pattern generation in block 404. The Eye Pattern generation changes the timing into a differential pair and with windows for data inclusion and set transition periods as illustrated in FIG. 5. There are various other methods know to one skilled in the art to generate symbol rate for a client device such as a portable computer or like device.

FIG. 5 shows a graphical representation of adjustable symbol rates and adjustable bits per symbol according to the teachings of the present invention. In FIG. 5 symbols are represented by the envelopes whereas bit rates are represented by solid dots within each envelope. As a consequence in graph 502 the symbol rate is 1× and the bit rate is 4 bits per symbol. In graph 504 the symbol rate is 1.3× and the bit rate is 3 bits per symbol. In graph 506 the symbol rate is 2× and the bit rate is 2 bits per symbol. In graph 508 the symbol rate is 4× and the bit rate is 1 bit per symbol. It should be noted that in graph 500 as the symbol rate increases the bit rate decreases and vice versa. By transmitting data in accordance with the relationship between the bit rate and symbol rate shown in FIG. 5 constant throughput is maintained as the power supply to the mobile device changes from high to low thus conserving battery life.

Figure 6:
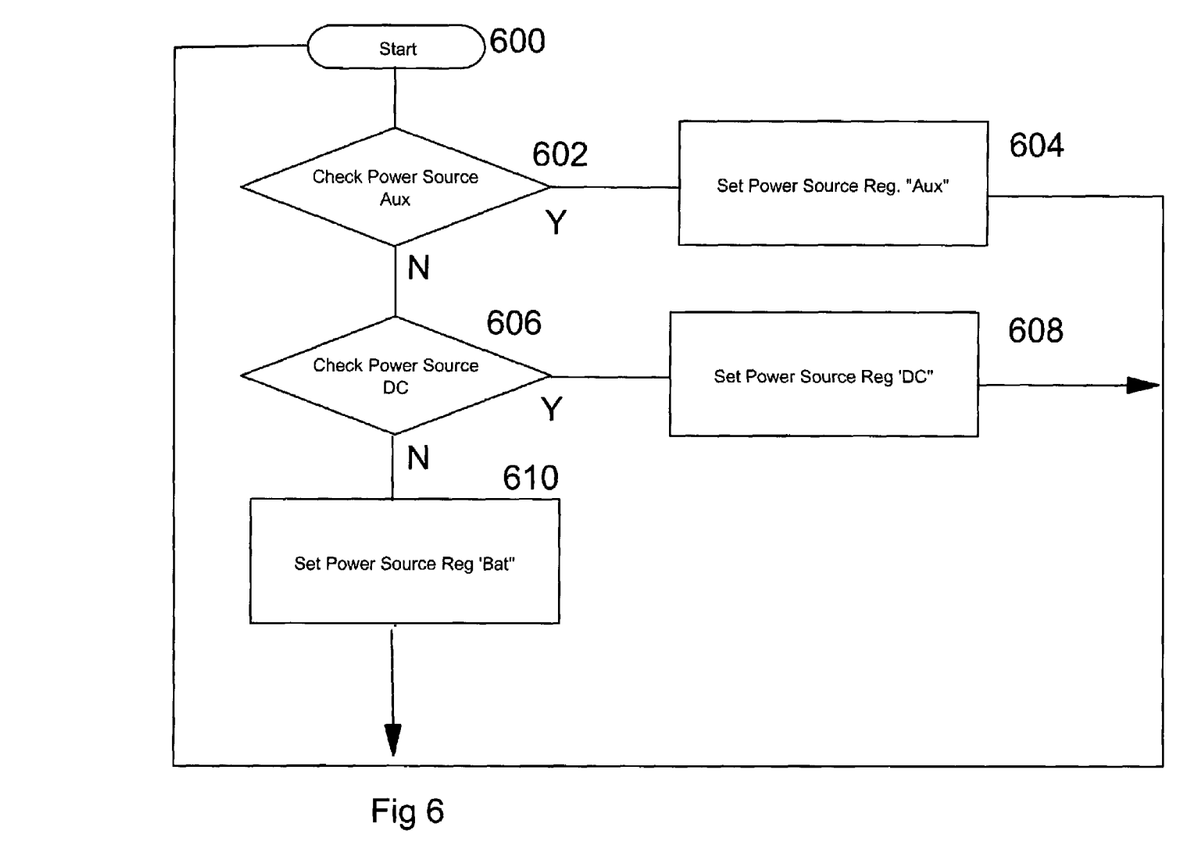
FIG. 6 shows a flowchart for the logic used to detect the power source that is being used by the mobile unit.

FIG. 6 shows a flowchart for the logic used in power type detector 345 (FIG. 3) to determine what source is providing power to the mobile device. As stated herein the symbol rate and bit rate of the client device is based upon the power source providing power to the client device. The program starts in block 600 and descends into block 602 whereat the output from AUX power 336 (FIG. 3) is checked. If the response is positive the program enters 604 and sets the "AUX" bit in power source register 344. If in block 602 the result is negative the program descends into 606 where it checks the output from DC power source 338. If the result is positive the program enters block 608 where it sets a bit for DC power in power source register 344. If the check from 606 is negative the mobile device must be running on battery power and the program descends into 610 where the battery power bit is set in power source register 344. After setting one of the bits in the power source register the program loops back to block 600 where it repeats the process previously described.

Figure 7:
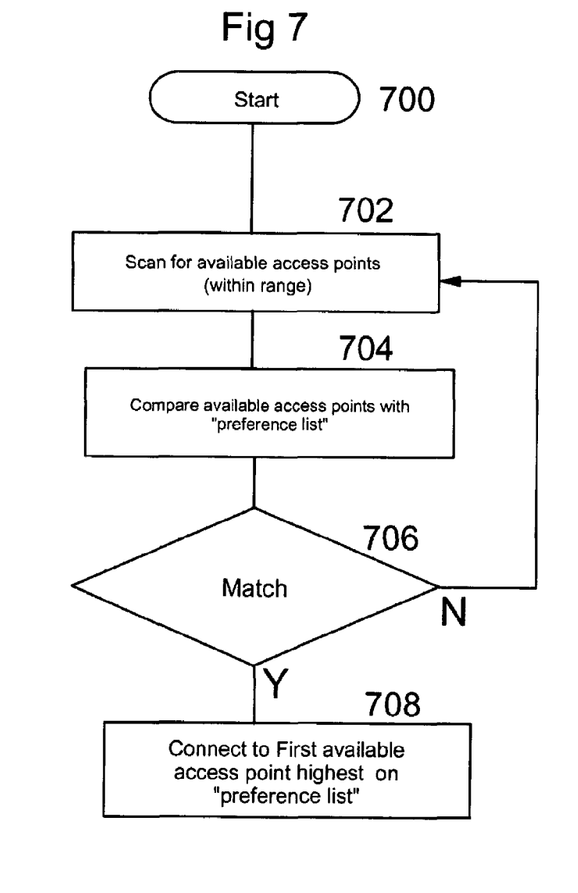
FIG. 7 shows a flowchart of the process used by the mobile device to connect to an Access Point.

FIG. 7 shows a flowchart of a program executed in the mobile device to establish a connection between the mobile device and an Access Point. The program begins in 700 and descends into 702 whereat the mobile device scans for Access Points within range. The scanning can be accomplished by having the client device listen for beacons from Access Points or having client device attempt to ping various networks. After determining which Access Points are within range the client device compares the available Access Points to Access Point preference list, block 704. The preference list is usually preloaded into the mobile unit The program then descends into block 706 where it checks for a match. If there is no match the program loops back to 702 and repeats the steps previously described. If a match occurs in 706 the program descends into 708 where it connects to the first available Access Point probably the one that matches the highest one on its preference list of available access points.

Figure 8:
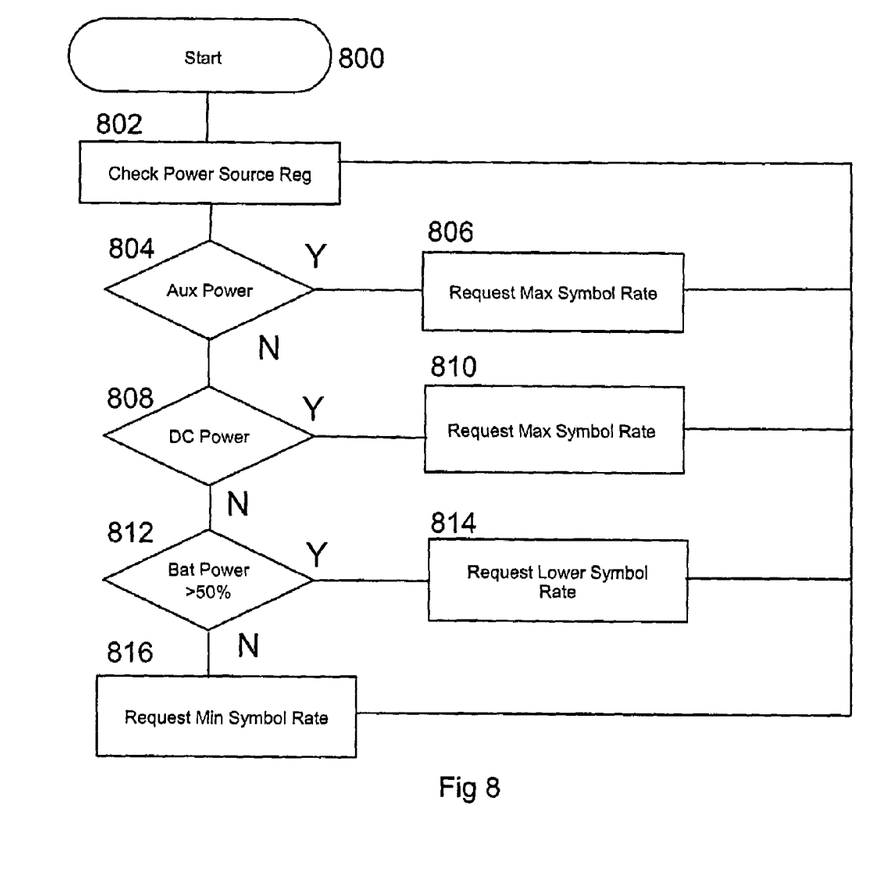
FIG. 8 shows a flowchart of a process by which the mobile device requests a desired symbol rate from the Access Point.

FIG. 8 is a flowchart for a program executed on the mobile device to determine the symbol rate at which the mobile device will communicate with a selected Access Point. The program starts in 800 and descends into 802 where it checks the power source register to determine what type of power is being used in the portable device. The program then descends into 804. If the setting is AUX power the program exits along the Y path into block 806 whereat the mobile device requests maximum symbol rate from the Access Point. The program then loops back to 802. If the AUX bit in the power source register is not set the program exits block 804 along the N path into block 808. In block 808 the program checks if the DC power bit in the power source register is set. If the bit is set the program exits along the Y path into block 810 where the program requests maximum symbol rate from the Access Point. The program then loops back to 802. If in block 808 the response is negative the program exits along the N patch into 812. It should be noted that if the power is neither AUX power or DC power then it must be battery power. In block 812 the program tests to see if the battery power is greater than 50% of maximum power available from the battery. If it is the program exits block 812 along the Y path into 814 whereat a lower symbol rate is requested from the Access Point. The program then loops back to block 802. If in block 812 the battery power is less than 50% the program exits along the N path into block 816 where it requests minimum symbol rate and loops back to 802. With respect to FIG. 5 minimum symbol rate would be graph 502 while maximum symbol rate would be graphed 508.

Figure 9:
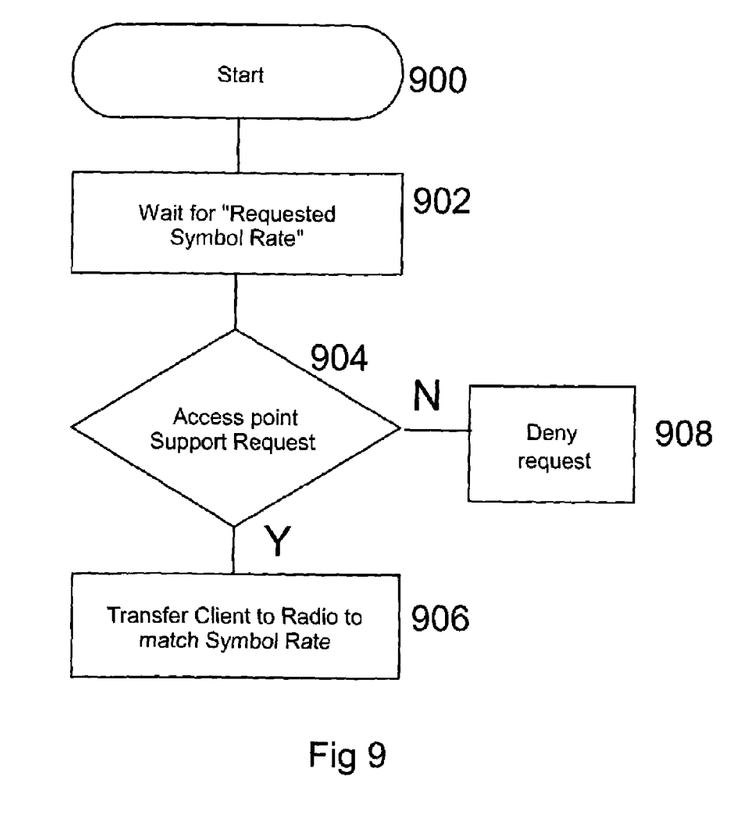
FIG. 9 shows a flowchart of a process used by the Access Point to accept or deny a requested symbol rate.

FIG. 9 shows a flowchart for a program executed in the Access Point to accept or deny a symbol rate requested by a mobile device. The program starts in 900 and descends into 902 where it waits for a requested symbol rate. As discussed in FIG. 8 the requested symbol rate would be received from a mobile unit within the operational range of the Access Point. Having received a requested symbol rate from a mobile unit the program descends into 904 where it makes a determination as to whether or not it can support or not support the requested symbol rate. If it cannot support the requested symbol rate the program exits along the No (N) path into 908 and issues a deny response. If in 904 the Access Point can support the requested symbol rate the program exits along the Yes (Y) path into 906 where the Access Point selects a wireless adapter with a symbol rate that matches the requested symbol rate. Thereafter, communication between the mobile device and Access Point is carried out using the agreed to symbol rate.

In summary, once a mobile unit registers with the Access Point the mobile unit determines the symbol rate based upon the power source to which the mobile unit is attached. It then negotiates with the Access Point to see if the Access Point can support that symbol rate. If the Access Point does support the symbol rate the communication between the Access Point and the mobile is consummated using the agreed upon symbol rate.

In view of the foregoing it will be evident to a person skilled in the art that various modifications may be made within the spirit and the scope of the present invention as hereinafter defined by the appended claims and that the present invention is thus not limited to the example provided.

What is claimed is:

1. A mobile device including: an adapter that provides interface to a wireless network; a bus controller operatively coupled to the adapter; I/O devices operatively coupled to the bus controller; a processor subsystem operatively coupled to the bus controller; a power supply generating power on multiple power rails; a power type detector monitoring the power rails and setting an indicia indicative of the type of power being used by said mobile device; a symbol rate generator that generates symbols at a symbol rate, each symbol including a number of bits per symbol, the symbol rate and the number of bits per symbol determined by the type of power being used; and wherein the number of bits per symbol is inversely proportional to the symbol rate and adjusted in order to maintain a constant throughput; and wherein the mobile device communicates with an Access Point that is adapted to; receive a request from the mobile device to operate at a requested symbol rate; determine symbol rates available to communicate in said Access Point; accept the request if any of the available symbol rates are compatible with the requested symbol rate; and deny the request if none of the available symbol rates are compatible with the requested symbol rate.

2. The mobile device of claim 1 further including a power source register wherein the indicia includes bits within said power source register, the bits identifying whether the type of power is DC power, AUX power, or battery power.

3. The mobile device of claim 1 or claim 2 wherein the bus controller includes a PCI bus controller.

4. The mobile device of claim 1 or claim 2 further including a symbol rate register to store a value representing the symbol rate at which the mobile device is running, the value based upon the type of power being used.

5. The mobile device of claim 1 or claim 2 wherein the I/O devices include a keyboard, a pointing device, and a video display.

6. The mobile device of claim 1 or claim 2 further including a flash program storage and a DASD operatively coupled to the controller.

7. The mobile device of claim 1 or claim 2 further including a battery operatively coupled to one of the multiple power rails.

8. The mobile device of claim 1 or claim 2 wherein the processor subsystem includes a memory;
   a memory controller operatively coupled to said memory; and a processor operatively coupled to the memory controller.

9. The mobile device of claim 1 or claim 2 wherein the adapter includes an RF transceiver;
   TX FIFO operatively coupled to the RF transceiver;
   RX FIFO operatively coupled to the RF transceiver;
   MAC (medium access controller) operatively coupled to the TX FIFO and RX FIFO.

10. A method to operate a mobile device running on battery power including the acts of: monitoring the battery power; if greater than N, N being a percentage of total power output of said battery, selecting a symbol rate for generating symbols lower than a maximum symbol rate at which said mobile device can operate; if said battery power is less than N, selecting a symbol rate for generating the symbols which is a minimum at which said mobile device can operate; loading a number of bits per symbol in each of the generated symbols; and wherein the number of bits per symbol is inversely proportional to the symbol rate and adjusted in order to maintain a constant throughput; and wherein the mobile device communicates with an Access Point that is adapted to: receive a request from the mobile device to operate at a requested symbol rate; determine symbol rates available to communicate in said Access Point; accept the request if any of the available symbol rates are compatible with the requested symbol rate; and deny the request if none of the available symbol rates are compatible with the requested symbol rate.

11. The method of claim 10 further including the acts of generating a message including the symbol rate selected; and
   forwarding said message.

12. The method of claim 10 or claim 11 wherein N>(is greater than) 50%.

13. A method of operating a mobile device including the acts of: providing a plurality of power rails to supply power to said mobile device; providing a register for storing information identifying the power rail supplying power to said mobile device; monitoring the power rails; setting a bit in said register to identify the power rail supplying power to said mobile device; selecting a symbol rate and a number of bits per symbol to transmit and receive data based upon the power rail that supplies power to said mobile device; and wherein the number of bits per symbol is inversely proportional to the symbol rate and adjusted in order to maintain a constant throughput; and wherein the mobile device communicates with an Access Point, the access point adapted to: receive a request from the mobile device to operate at a requested symbol rate; determine symbol rates available to communicate in said Access Point; accept the request if any of the available symbol rates are compatible with the requested symbol rate; and deny the request if none of the available symbol rates are compatible with the requested symbol rate.

14. The method of claim 13 further including the act of setting an indicia indicating the selected symbol rate.

15. The method of claim 13 or claim 14 wherein the plurality of power rails includes AUX power, DC power, and battery power.

16. The method of claim 13 or claim 14 further including the acts of generating a request message including the selected symbol rate; and
   transmitting said message to an Access Point to which the mobile device is attached.

17. The method of claim 16 further including the acts of receiving in said mobile unit a response message with information confirming permission to communicate at a particular symbol rate and thereafter using the particular symbol rate to communicate with the Access Point.

18. An Access Point device including: a first adapter that provides an interface to a wired network; a subassembly that provides an interface to a wireless network; said subassembly being operable to generate messages having different symbol rate and different number of bits per symbol envelope; a system controller; a first bus operatively coupling the system controller to the subassembly; and a second bus operatively coupling the system controller to the first adapter; and wherein the Access Point device is adapted to: receive a request from the mobile device to operate at a requested symbol rate; determine symbol rates available to communicate in said Access Point; accept the request if any of the available symbol rates are compatible with the requested symbol rate; and deny the request if none of the available symbol rates are compatible with the requested symbol rate.

19. The Access Point of claim 18 wherein the subassembly includes N adapters, N greater than 1, wherein each of the N adapters operate at a different symbol rates and different number of bits per symbol.

20. A method including the acts of: determining an Access Point with which a mobile device wishes to communicate, the Access Point adapted to: receive a request from the mobile device to operate at a requested symbol rate; determine symbol rates available to communicate in said Access Point; accept the request if any of the available symbol rates are compatible with the requested symbol rate; and deny the request if none of the available symbol rates are compatible with the requested symbol rate; determining a power source on which said mobile device is running; selecting a symbol rate and a number of bits per symbol with which said mobile device will communicate based upon the type of power that said mobile unit is using; and wherein the number of bits per symbol is inversely proportional to the symbol rate and adjusted in order to maintain a constant throughput.

21. The method of claim 20 wherein the determining act further includes executing in said mobile device a process compatible with the process set forth in IEEE 802.11 specification for wireless network for wireless device to register with an Access Point.

22. The method set forth in claim 20 wherein the selecting act further includes monitoring outputs from power sources provided in said mobile device if one of the outputs indicate a first power source selecting a maximum symbol rate.

23. The method of claim 22 wherein the first power source includes DC power.

24. The method of claim 22 wherein the first power source includes AUX power.

25. The method set forth in claim 20 wherein the selecting act further includes monitoring outputs from power sources provided in said mobile device if one of the outputs indicate a second power source selecting a symbol rate less than maximum.

26. The method of claim 25 wherein the second power source includes battery power.

27. The method of claim 26 further including the acts of: testing the battery power to determine output level, if output level>(greater than) 50% revert to intermediate symbol rate and if output level<(less than) 50% revert to minimum symbol rate.

28. A computer program product including: a computer readable medium on which computer program is recorded, said computer program including a first code module that establishes a link between a mobile device and an Access Point, the Access Point adapted to: receive a request from the mobile device to operate at a requested symbol rate; determine symbol rates available to communicate in said Access Point; accept the request if any of the available symbol rates are compatible with the requested symbol rate; and deny the request if none of the available symbol rates are compatible with the requested symbol rate; a second code module that determines a power source on which said mobile device is running; a third code module to select a symbol rate and a number of bits per symbol based upon the type of power used to operate said mobile device; and wherein the number of bits per symbol is inversely proportional to the symbol rate and adjusted in order to maintain a constant throughput.

29. An adapter including: a transceiver to communicate with a wireless network; a first buffer to buffer data to be transmitted into the wireless network operatively coupled to the transceiver; a second buffer for receiving data from the network operatively coupled to the transceiver; a system interface for coupling to a system bus; a Medium Access Controller (MAC) operatively coupled to the system interface and the first buffer and the second buffer respectively; symbol generator that provides variable symbol at a symbol rate in which data is packaged at a number of bits per symbol and forwarded to the wireless network; wherein the number of bits per symbol is inversely proportional to the symbol rate and adjusted in order to maintain a constant throughput; and wherein the adapter is associated with an Access Point that is adapted to: receive a request from the mobile device to operate at a requested symbol rate; determine symbol rates available to communicate in said Access Point; accept the request if any of the available symbol rates are compatible with the requested symbol rate; and deny the request if none of the available symbol rates are compatible with the requested symbol rate.

30. The adapter of claim 29 further including a power antenna operatively coupled to the transceiver.

* * * * *